US010859714B2

(12) United States Patent
Craven et al.

(10) Patent No.: US 10,859,714 B2
(45) Date of Patent: Dec. 8, 2020

(54) REAL-TIME KINEMATICS FOR END OF TRAIN

(71) Applicant: Westinghouse Air Brake Technologies Corporation, Wilmerding, PA (US)

(72) Inventors: Stephen Craven, Hiawatha, IA (US); Jeffrey D. Kernwein, Cedar Rapids, IA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 210 days.

(21) Appl. No.: 15/855,427

(22) Filed: Dec. 27, 2017

(65) Prior Publication Data
US 2019/0196026 A1 Jun. 27, 2019

(51) Int. Cl.
| | |
|---|---|
| *G01S 19/50* | (2010.01) |
| *H04B 7/185* | (2006.01) |
| *H04B 1/06* | (2006.01) |
| *G01S 19/40* | (2010.01) |
| *G01S 19/43* | (2010.01) |

(52) U.S. Cl.
CPC .......... *G01S 19/50* (2013.01); *H04B 7/18545* (2013.01); *G01S 19/40* (2013.01); *G01S 19/43* (2013.01); *H04B 1/06* (2013.01)

(58) Field of Classification Search
CPC .......... G01S 19/50; G01S 19/40; G01S 19/43; H04B 7/18545
USPC ........................ 342/357.33, 357.23, 357.26
See application file for complete search history.

(56) References Cited

U.S. PATENT DOCUMENTS

| | | | | |
|---|---|---|---|---|
| 5,969,643 | A | * | 10/1999 | Curtis ..................... B61L 3/004 340/933 |
| 6,081,769 | A | * | 6/2000 | Curtis ....................... B61L 1/14 246/122 R |
| 6,227,625 | B1 | | 5/2001 | Gaughan |
| 6,421,587 | B2 | * | 7/2002 | Diana ................... B61L 25/023 246/122 R |

(Continued)

FOREIGN PATENT DOCUMENTS

| KR | 1020120083539 A | 7/2012 |
|---|---|---|
| KR | 1020170005912 A | 1/2017 |

OTHER PUBLICATIONS

"An Introduction to GNSS: Chapter 5 Resolving Errors", NovAtel Inc. (2 pages).

(Continued)

*Primary Examiner* — Chuong P Nguyen
(74) *Attorney, Agent, or Firm* — Christopher R. Carroll; The Small Patent Law Group LLC (57) ABSTRACT

A method of determining geographic positions of a head of train (HOT) unit and an end of train (EOT) unit of a train includes receiving, by the HOT, first satellite radio position data and position correction data; determining, by the HOT, a first geographic location of the HOT based on the first satellite radio position data and the position correction data received by the HOT; receiving, by the EOT, second satellite radio position data; receiving, by the EOT from the HOT via a communication link, a copy of the position correction data received by the HOT; determining, by the EOT, a second geographic location of the EOT based on the second satellite radio position data and the position correction data received by the EOT; and receiving, by the HOT from the EOT, a copy of second geographic location of the EOT.

20 Claims, 3 Drawing Sheets

(56) References Cited

U.S. PATENT DOCUMENTS

| | | | | |
|---|---|---|---|---|
| 6,915,191 | B2* | 7/2005 | Kane | B61L 15/0054 701/19 |
| 7,317,987 | B2* | 1/2008 | Nahla | B61L 25/021 701/301 |
| 7,467,032 | B2* | 12/2008 | Kane | B61L 15/0027 104/307 |
| 8,688,297 | B2* | 4/2014 | Morris | B61L 15/0054 342/357.62 |
| 8,918,237 | B2* | 12/2014 | Morris | B61L 23/34 701/19 |
| 8,965,604 | B2* | 2/2015 | Nandedkar | B61L 25/026 701/19 |
| 9,022,325 | B2* | 5/2015 | Tsukamoto | B61L 3/008 246/167 R |
| 9,902,412 | B2* | 2/2018 | Fernandes | B60T 17/221 |
| 10,000,222 | B2* | 6/2018 | Allshouse | B61L 25/025 |
| 10,518,790 | B2* | 12/2019 | Garmson | B61L 27/0066 |
| 10,667,087 | B2* | 5/2020 | Lindoff | H04W 24/02 |
| 2005/0107954 | A1 | 5/2005 | Nahla | |
| 2007/0150130 | A1 | 6/2007 | Welles et al. | |
| 2012/0116616 | A1 | 5/2012 | Morris | |
| 2014/0198715 | A1* | 7/2014 | Zasowski | H04W 4/40 370/315 |
| 2017/0043797 | A1 | 2/2017 | Allshouse et al. | |
| 2017/0088153 | A1 | 3/2017 | Fernandes | |
| 2019/0196022 | A1* | 6/2019 | Rezaei | G01S 19/41 |
| 2019/0366998 | A1* | 12/2019 | Bolte | B60T 17/228 |

OTHER PUBLICATIONS

Gakstatter, Eric, "What Exactly Is GPS NMEA Data?", GPS World, novatel.com/succeed, Feb. 4, 2015. (8 pages).

"GPS Accuracy", GPS.gov., U.S. Air Force, Dec. 5, 2017. (3 pages).

"How does RTK (Real Time Kinetic) Work?" https://racelogic.support/01VBOX_Automotive/01General_Information/Knowledge_Base/How_does_RTK_(Real_Time_Kinetic)_Work%3F, Racelogic Limited, 2014. (4 pages).

"How RTK works", https://docs.emlid.com/reach/common/tutorials/rtk-introduction/, Emlid Ltd. (4 pages) ; printed Dec. 6, 2017.

"Placing the base", https://docs.emlid.com/reachrs/common/tutorials/placing-the-base/, Emlid Ltd. (16 pages) ; printed Dec. 6, 2017.

"Real Time Kinematic." https://en.wikipedia.org/wiki/Real_Time_Kinematic, Wikipedia, Oct. 12, 2017. (4 pages).

"RTK Fundamentals", http://www.navipedia.net/index.php/RTK_Fundamentals, Navipedia, 2011. (5 pages).

"The Basics of GPS", Sparkfun. (4 pages) ; printed Dec. 6, 2017.

International Preliminary Report on Patentability dated Jul. 9, 2020 for corresponding application No. PCT/US2018/021493. (12 pages).

* cited by examiner

REAL-TIME KINEMATICS FOR END OF TRAIN

BACKGROUND OF THE INVENTION

Field of the Invention

The present invention relates to train control and, more particularly, to improvements in dynamically determining a train's position, in particular the positions of first and second vehicles, e.g., the lead and last vehicles, of the train during travel of the train along a track.

Description of Related Art

In connection with the control one or more operations of a train, sometimes called "positive train control" (PTC), it can be desirable to be able to dynamically ascertain the position of the train as it travels along a track. Presently, GPS is used to dynamically determine the train's position, and "dead reckoning" is used when GPS is not available.

When GPS is used, a lead vehicle of the train would typically include a first GPS receiver coupled to or part of a head of train (HOT) unit used for train control, and the last vehicle of the train would typically include a second GPS receiver coupled to or as part of an end of train (EOT) unit. In response to receiving a sample of GPS satellite data, the first GPS receiver can, in a manner known in the art, determine and output a first geographical location of the lead vehicle of the train and, more particularly, the first GPS receiver. Similarly, in response to receiving the same or a different sample of GPS satellite data, the second GPS receiver can, in a manner known in the art, determine and output a second geographical location of the last vehicle of the train and, more particularly, the second GPS receiver.

The rate that each of the first and second GPS receivers sample GPS satellite data, e.g., between 1 Hz and 10 Hz, is sufficiently fast that variances in the time each GPS receiver samples GPS satellite data can have little or no effect on the ability of the GPS receiver to dynamically determine its geographical location at the moment the GPS satellite data was sampled, or the determination and use of the first and second geographical locations of the lead and last vehicles determined from said samples in connection with train control. To this end, each GPS receiver can sample GPS satellite data periodically and/or aperiodically as deemed suitable and/or desirable.

Upon the second GPS receiver determining a second geographical location of the last vehicle of the train based on GPS satellite data sampled thereby, the EOT can communicate this second geographical location to the HOT via a communication link, typically a wireless communication link, between the HOT and EOT. Because the HOT is now aware of the second geographical location communicated to the HOT by the EOT, and is aware of the first geographical location of the lead vehicle from the output of the first GPS receiver based on GPS satellite data sampled thereby, the HOT can control one or more operations of the train based on these first and second geographical locations.

The process of the first and second GPS receivers sampling GPS satellite data and determining the first and second geographical locations of the lead and last vehicles of the train can be repeated, e.g., continuously, as long as desired as an aid to the safe operation of the train.

First and second geographical locations of the lead and last vehicles of train based on GPS satellite data can have an accuracy of ≤7.8 meters with a 95% probability (see e.g., https://www.gps.gov/systems/gps/performance/accuracy/). However, it would be desirable to improve this accuracy, e.g., within 1-4 centimeters, without the introduction of additional, possibly expensive and power hungry, hardware (e.g., receiver) to the EOT.

SUMMARY OF THE INVENTION

Generally, provided is a method for adjusting geographic locations of a head of train (HOT) unit and an end of train (EOT) unit determined from global positioning system (GPS) satellite radio positioning data received by the HOT and EOT using real-time kinematic (RTK) position correction data transmitted by a ground-based base station to the HOT which forwards the position correction data to the EOT via a train communication link, such as, in a preferred and non-limiting embodiment or example, a wireless communication link.

In one preferred and non-limiting embodiment or example, the position correction data is combined with the satellite radio positioning data received by each of the HOT and EOT to determine more accurate geographic locations of the HOT and EOT over the geographic locations of the HOT and EOT determined from the global positioning system (GPS) satellite radio positioning data alone.

Using the combination of the position correction data and the satellite radio positioning data, the accuracy of the geographic locations of the HOT and EOT, e.g., the user range error (URE)—expressed as a radius from a calculated position to an actual position, can be determined, in one preferred and non-limiting embodiment or example, to be nominally within 1 cm±2 parts-per-million (ppm) horizontally and 2 cm±2 ppm vertically. This is in contrast to the geographic locations of the HOT and EOT determined only using GPS data wherein the URE is ≤7.8 m, with 95% probability.

Further preferred and non-limiting embodiments or examples are set forth in the following numbered clauses.

Clause 1: A method comprising: (a) receiving, by first and second radio receivers mounted to respective lead and last vehicles of a train, satellite radio positioning data; (b) receiving, by the first radio receiver, position correction data; (c) determining first geographical position data corresponding to a first geographical position of the first radio receiver based on the position correction data received by the first radio receiver in step (b) and the satellite radio positioning data received by the first radio receiver in step (a); (d) following step (b), receiving at the last vehicle of the train a copy of the position correction data received by the first radio receiver in step (b), wherein the copy of the position correction data received by the first radio receiver is communicated from the lead vehicle of the train to the last vehicle of the train; (e) following step (d), determining second geographical position data corresponding to a second geographical position of the second radio receiver based on the position correction data received at the last vehicle of the train in step (d) and the satellite radio positioning data received by the second radio receiver in step (a); and (f) following step (e), receiving at the lead vehicle of the train from the last vehicle of the train the second geographical position data determined in step (e).

Clause 2: The method of clause 1 can further include: (g) controlling at least one operation of the train based on at least the second geographical position data received at the lead vehicle of the train from the last vehicle of the train in step (f).

Clause 3: The method of clause 1 or 2, wherein: the first geographical position data can be determined by a first processor, or the first radio receiver, or the combination of the first processor and the first radio receiver; and the second geographical position data can be determined by a second processor, or the second radio receiver, or the combination of the second processor and the second first radio receiver.

Clause 4: The method of any one of clauses 1-3, wherein: the first processor can be mounted to the lead vehicle of the train; and the second processor can be mounted to the last vehicle of the train.

Clause 5: The method of any one of clauses 1-4, wherein, in step (d), the copy of the position correction data can be communicated wirelessly from the lead vehicle to the last vehicle.

Clause 6: The method of any one of clauses 1-5, wherein, in step (f), the second geographical position data received at the lead vehicle of the train can be communicated wirelessly from the last vehicle of the train to the lead vehicle of the train.

Clause 7: The method of any one of clauses 1-6, wherein, in step (b), the position correction data can be received by the first radio receiver wirelessly from a ground base station.

Clause 8: The method of any one of clauses 1-7, wherein the position correction data can comprise a distance and/or a direction to adjust the satellite radio positioning data received by the first and second radio receivers to determine the respective first geographical position data and the second geographical position data.

Clause 9: A method comprising: (a) receiving, by a first radio receiver, satellite radio positioning data; (b) receiving, by the first radio receiver, position correction data; (c) determining, by a first processor, or the first radio receiver, or the combination of the first processor and the first radio receiver, a geographical location of the first radio receiver based on the satellite radio positioning data received in step (a) and the position correction data received in step (b); (d) receiving, by a second radio receiver, the satellite radio positioning data; (e) receiving, by a second processor from the first processor, a copy of the position correction data received by the first radio receiver in step (b); and (f) determining, by the second processor, or the second radio receiver, or the combination of the second processor and the second radio receiver, a geographical location of the second radio receiver based on the satellite radio positioning data received in step (d) and the position correction data received in step (e).

Clause 10: The method of clause 9, wherein the method can further include: (g) receiving by the first processor from the second processor the geographical location of the second radio receiver determined in step (f).

Clause 11: The method of clause 9 or 10, wherein: a communication link can communicatively connect the first and second processors; in step (e), the copy of the position correction data can be received by the second processor from the first processor via the communication link; and in step (g), the geographical location of the second radio receiver can be received by the first processor from the second processor via the communication link.

Clause 12: The method of any one of clauses 9-11, wherein the communication link can be a radio link.

Clause 13: The method of any one of clauses 9-12, wherein: the satellite radio positioning data can be global positioning system (GPS) satellite radio positioning data; and the position correction data can be real-time kinematic (RTK) position correction data.

Clause 14: The method of any one of clauses 9-13, wherein: the first processor can be located on a lead vehicle of a train; and the second processor can be located on a last vehicle of the train.

Clause 15: The method of any one of clauses 9-14, wherein: the first radio receiver and the first processor can comprise a head of train (HOT) unit of a train; and the second radio receiver and the second processor can comprise an end of train (EOT) unit of the train.

Clause 16: A method comprising: (a) providing, in a first vehicle of a train, a head of train (HOT) unit; (b) providing, in a second vehicle of the train, an end of train (EOT) unit; (c) providing a radio communication link between the HOT and the EOT; (d) receiving, by the HOT, first satellite radio position data and position correction data; (e) determining, by the HOT, a first geographic location of the HOT based on the first satellite radio position data and the position correction data received by the HOT in step (d); (f) receiving, by the EOT, second satellite radio position data; (g) receiving, by the EOT from the HOT via the radio communication link, a copy of the position correction data received by the HOT in step (d); (h) determining, by the EOT, a second geographic location of the EOT based on the second satellite radio position data and the position correction data received by the EOT in step (g); and (i) receiving, by the HOT from the EOT, a copy of second geographic location of the EOT.

Clause 17: The method of clause 16, wherein the method can further include: (j) controlling, by the HOT, at least one operation of the train based on at least the second geographic location of the EOT received by the HOT from the EOT in step (i).

Clause 18: The method of clause 16 or 17, wherein: the HOT can include a first processor and a first radio receiver in communication with the first processor; the EOT can include a second processor and a second radio receiver in communication with the second processor; and the radio communication link can comprise: a first radio transceiver in communication with the first processor; a second radio transceiver in communication with the second processor; and the first and second radio transceivers in wireless communication with each other.

Clause 19: The method of any one of clauses 16-18, wherein the position correction data can include a distance and/or a direction that the first satellite radio position data and the second satellite radio position data are adjusted to determine the respective first geographic location of the HOT and the second geographic location of the EOT.

Clause 20: The method of any one of clauses 16-19, wherein the first and second satellite radio position data can be the same.

DESCRIPTION OF THE INVENTION

Various non-limiting examples will now be described with reference to the accompanying figures where like reference numbers correspond to like or functionally equivalent elements.

For purposes of the description hereinafter, the terms "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the invention. Hence, the specific examples or aspects disclosed herein are not to be construed as limiting.

Figure 1:
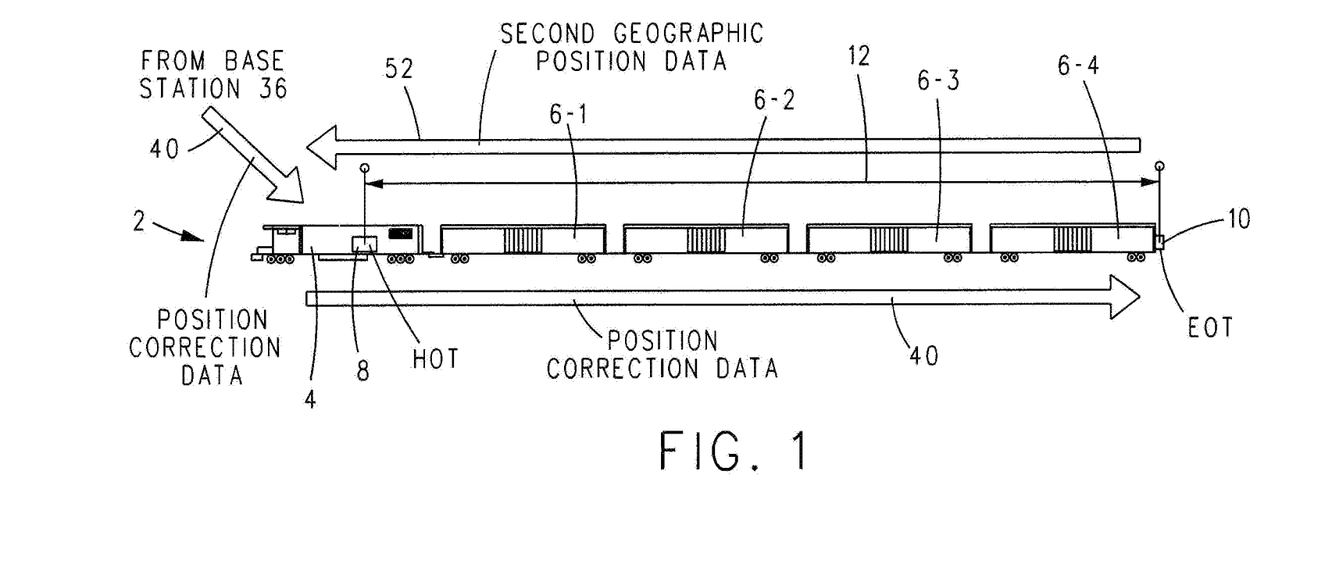
FIG. 1 is a schematic, side-view, of a train, including a locomotive and a number of cars, showing non-limiting example locations of a head of train (HOT) unit and an end of train (EOT) unit in communication via a communication link, and data flow directions for position correction data and second geographic position data.

With reference to FIG. 1, in a non-limiting embodiment or example, a train 2 can include a locomotive 4 as a lead vehicle of train 2 and a number of cars 6-1-6-X, where "X" can be any whole number greater than or equal to 2. The example train 2 shown in FIG. 1 includes four cars 6-1, 6-2, 6-3, and 6-4, where car 6-4 is the last vehicle of train 2 and locomotive 4 is the lead vehicle of the train. However, this is not to be construed in a limiting sense since it is envisioned that the lead vehicle of train 2 can be a car 6 other than a locomotive 4, e.g., locomotive 4 can be positioned in train 2 between the lead vehicle and the last vehicle. For the purpose of the following description, locomotive 4 will be considered the lead vehicle of train 2.

In a non-limiting embodiment or example, locomotive 4 can include a head of train (HOT) unit which can be used to update the train operator with the status of one or more operations of the train and which can be used by the train operator to control the operation of the train in a manner known in the art.

In a non-limiting embodiment or example, train 2 can also include an end of train (EOT) unit 10 which, in a non-limiting embodiment or example, can typically be mounted on the last car 6-4 of train 2. In a non-limiting embodiment or example, HOT 8 and EOT 10 are in bi-directional communication with each other via a communication link 12. In a non-limiting embodiment or example, communication link 12 can be a radio link. However, this is not to be construed in a limiting sense.

Figure 2:
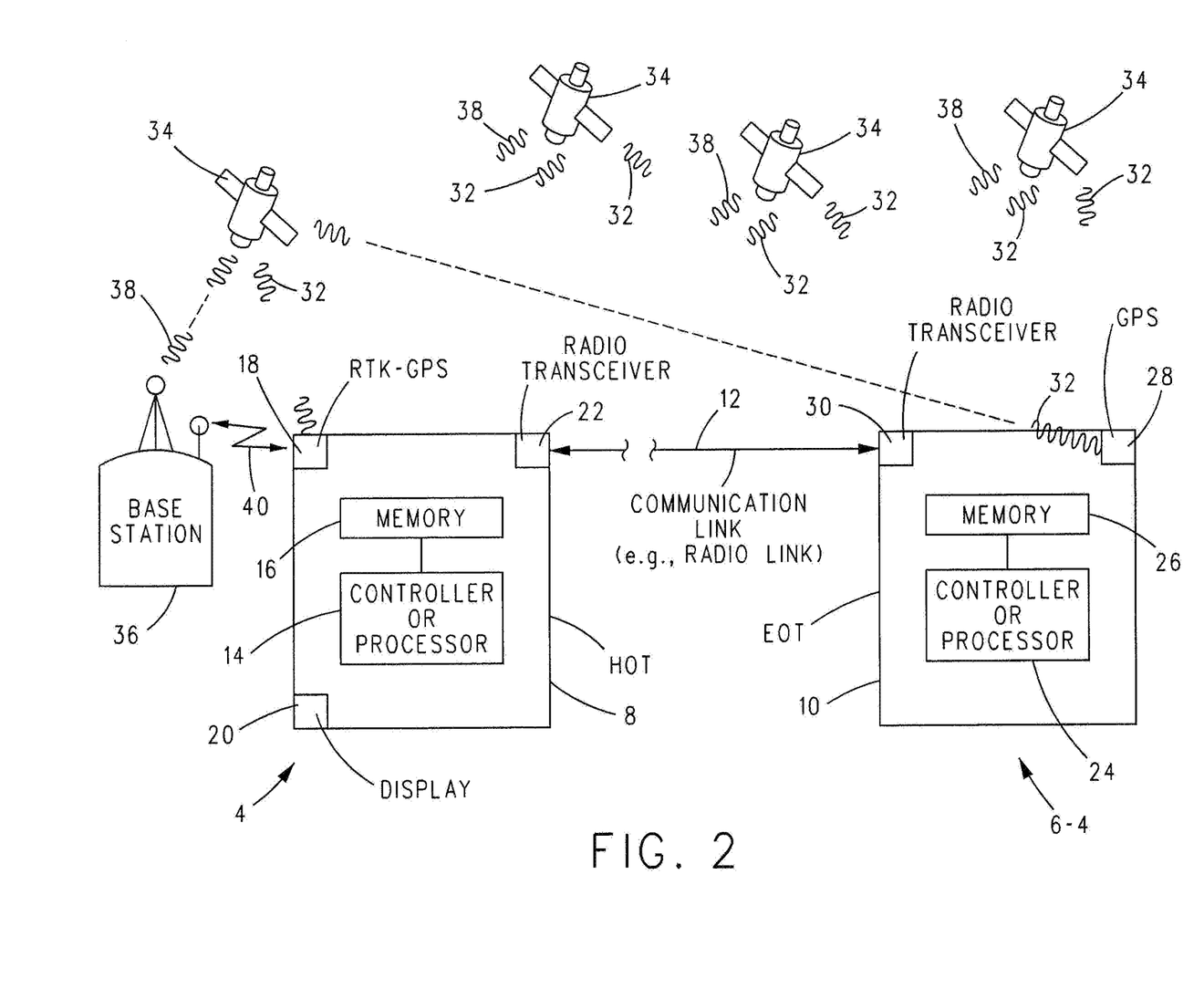
FIG. 2 is diagrammatic illustration of the HOT, EOT, and communication link of FIG. 1 including a number of satellites sending GPS satellite radio positioning data for receipt by radio receivers of the HOT and EOT, and a base station for receiving satellite signals and for sending position correction data to the radio receiver of the HOT.

With reference to FIG. 2 and with continuing reference to FIG. 1, in a non-limiting embodiment or example, HOT 8 can include a controller or processor 14, a memory 16, a radio receiver 18, a display 20, and a radio transceiver 22. In a non-limiting embodiment or example, EOT 10 can include a controller or processor 24, a memory 26, a radio receiver 28, and a radio transceiver 30. In a non-limiting embodiment or example, the communication link 12 between HOT 8 and EOT 10 can be a radio link supported by radio transceivers 22 and 30. Radio transceivers 18 and 28 can be configured to receive GPS satellite radio positioning data 32 from a number of satellites 34 in a manner known in the art. In a non-limiting embodiment or example, satellites 34 are configured to transmit GPS satellite radio positioning data, in the form of GPS data, and radio receivers 18 and 28 can each be configured to receive the GPS satellite positioning data 32 from satellites 34. This GPS satellite radio positioning data 32 enables radio receivers 18 and 28 to determine their respective first and second geographical positions on the surface of the earth with a first degree of accuracy or probability.

In a non-limiting embodiment or example, a base station 36 positioned at a known geographical position also receives satellite signals 38 from a number of satellites. These satellite signals 38 can be transmitted by one or more of satellites 34, by a different set of satellites (not specifically shown), or some combination thereof. Base station 36 determines from phase measurements of the satellite signals 38 real-time kinematic (RTK) position correction data 40 that base station 36 transmits to radio receiver 18. The position correction data 40 transmitted from base station 36 to radio receiver 18 is based on a technique known as real-time kinematic (RTK) that uses carrier-based ranging and provides ranges that are orders of magnitude more precise than those available through GPS data positioning.

In a non-limiting embodiment or example, radio receiver 18 can be configured to receive GPS satellite radio positioning data 32 from which a GPS position of radio receiver 18 can be determined, and can be configured to receive position correction data 40 from base station 36 in a manner known in the art. The foregoing discussion regarding how radio receivers 18 and 28 receive GPS satellite radio positioning data 32 and how radio receiver 18 receives RTK position correction data 40 from base station 32 is well known in the art and is described only generally herein for the purpose of background. Accordingly, the foregoing description regarding how radio receivers 18 and 28 receive GPS satellite radio positioning data 32 and how radio receiver 18 receives RTK position correction data 40 is not to be construed in a limiting sense.

In a non-limiting embodiment or example, once radio receiver 18 has received satellite radio positioning data 32 and RTK position correction data 40, first geographical position data corresponding to a first geographical position of radio receiver 18 can be determined with a second, greater degree of accuracy or probability based on the position correction data 40 and the satellite radio positioning data 32 received by radio receiver 18. More specifically, the position correction data 40 and the satellite radio positioning data 40 received by radio receiver 18 can be combined in a manner known in the art to determine first geographical position data corresponding to a first geographical position of radio receiver 18 with a second, greater degree of accuracy or probability than using just the GPS satellite radio positioning data 32 alone. The combining of GPS satellite radio positioning data 32 and RTK position correction data 40 can be performed in a manner known in the art which will not be described further herein for the purpose of simplicity of description.

In a non-limiting embodiment or example, due to power consumption and size limitations, radio receiver 28 of EOT 10 may not be equipped to receive RTK position correction data 40 directly from base station 36. To overcome this, during the reading by processor 14 of the data stream output by radio receiver 18, which data stream includes the first geographical position data corresponding to the first geographical position of radio receiver 18 (for the purpose of train control and, optionally, for display on display 20), radio receiver 18 also samples the position correction data 40 included in this data stream.

In a non-limiting embodiment or example, the position correction data 40 sampled by processor 18 of HOT 8 is forwarded thereby to processor 24 of EOT 10 via communication link 12. In response to receiving this position correction data from EOT 8, processor 24 of EOT 10 can combine this position correction data 40 with the GPS positioning data output by radio receiver 28 to obtain second geographical position data corresponding to a second geographical position of radio receiver 28 with a second degree of accuracy or probability that is greater than the first degree of accuracy of probability that can be achieved utilizing only the GPS satellite positioning data 32 received by radio receiver 28.

In this manner, the position correction data 40 received radio receiver 18 can be utilized to determine the geographical position of radio receiver 28 more precisely than the use of GPS satellite radio positioning data 32 received by radio receiver 28 alone. To this end, use of the preexisting communication link 12 to dispatch position correction data 40 from HOT 8 to EOT 10 avoids the need for radio receiver 28 to include capabilities for receiving RTK position correction data 40 directly from base station 36.

In a non-limiting embodiment or example, once the second geographical position data corresponding to the second geographical position of radio receiver 28 has been determined, this second geographical position data is dispatched by processor 24 of EOT 10 to processor 14 of HOT 8 via communication link 12.

In a non-limiting embodiment or example, the first geographical position data corresponding to the first geographical position of radio receiver 18 and the second geographical position data corresponding to the second geographical position of radio receiver 30 can be used by processor 14 of HOT 8 in a manner known in the art. For example, one or both of the first and second geographical positions can be displayed on display 20 of HOT 8. In another example, at least one operation of train 4 can be controlled based on at least the second geographical position data received by processor 14 of HOT 8 from processor 24 of EOT 10. One example of controlling the operation of the train can include the train operator controlling the speed of the train along a speed-limited length of track in a manner that avoids at least car 6-4 from being above the speed limit established for said section of track. In other words, the train operator knowing the second geographical position of EOT 10 can operate the train 2 in a manner that avoids the speed of car 6-4 from exceeding the speed limit along a pre-determined length of track on which train 4 is traveling.

In a non-limiting embodiment or example, the first geographical position data and/or the second geographical position data at processor 14 of HOT 8 can be updated periodically or aperiodically as deemed suitable and/or desirable. The second geographical position data can be forwarded from EOT 10 to HOT 8 periodically and/or aperiodically as deemed suitable and/or desirable.

In a non-limiting embodiment or example, the first geographical position data can be determined by processor 14, radio receiver 18, or the combination thereof. In a non-limiting embodiment or example, the second geographical position data can be determined by processor 24, radio receiver 28, or the combination thereof. In an example, HOT 8 including processor 14 can be mounted to the lead vehicle (locomotive) 4 of train 2 and EOT 10 including processor 24 can be mounted to the last vehicle (car 6-4) of train 2. However, this is not to be construed in a limiting sense since it is envisioned that HOT 8 including processor 14 and EOT 10 including processor 24 can reside anywhere along the length of train 2 as deemed suitable and/or desirable by one skilled in the art.

In a non-limiting embodiment or example, the copy of the position correction data received at EOT 10 is communicated wirelessly from HOT 8 via communication link 12. In an example, the second geographical position data received by HOT 8 is communicated wirelessly via communication link from EOT 10.

Figure 3:
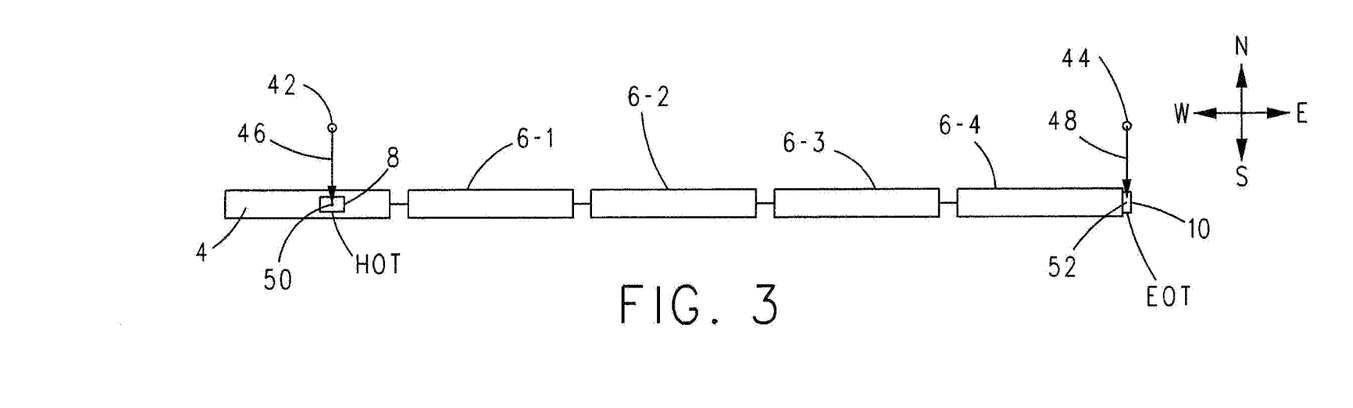
FIG. 3 is a diagrammatic illustration of how the position correction data can be used to adjust the geographic position data used to determine the geographic positions of the radio receivers of the HOT and EOT.

With reference to FIG. 3 and with continuing reference to FIGS. 1 and 2, assume for the purpose of illustration that in response to receiving GPS satellite positioning data 32 radio receivers 18 and 28 place the geographical positions of HOT 8 and EOT 10 at locations 42 and 44, e.g., north of the actual locations of HOT 8 and EOT 10 by distances 46 and 48, respectively. The position correction data 40 enables the calculated first and second geographical position data to be adjusted to more closely correspond to the actual first and second geographical positions of radio receiver 18 of HOT 8 and radio receiver 28 of EOT 10. In an example, the position correction data 40 includes a distance and a direction to adjust the geographical positions of HOT 8 and EOT 10 determined based on GPS satellite radio positioning data to determine the corresponding first and second geographical position data with the second, greater degree of accuracy or probability.

In the example shown in FIG. 3, the position correction data 40 adjusts the calculated geographical position data 42 by distance 46 in a south direction to the first geographical position data 50 of radio receiver 18 of HOT 8, which first geographical position data corresponds to the first geographical position of radio receiver 18 of HOT 8. Similarly, the position correction data 40 adjusts the calculated geographical position data 44 by distance 48 in the south direction to the second geographical position data 52 of radio receiver 28 of EOT 10, which second geographical position data corresponds to the second geographical position of radio receiver 24 of EOT 10. In this manner, any errors in the difference between the calculated geographical position data and the actual geographical position of radio receivers 18 and 28 determined using GPS satellite positioning data 32 alone can be corrected as needed by the position correction data 40.

Figure 4:
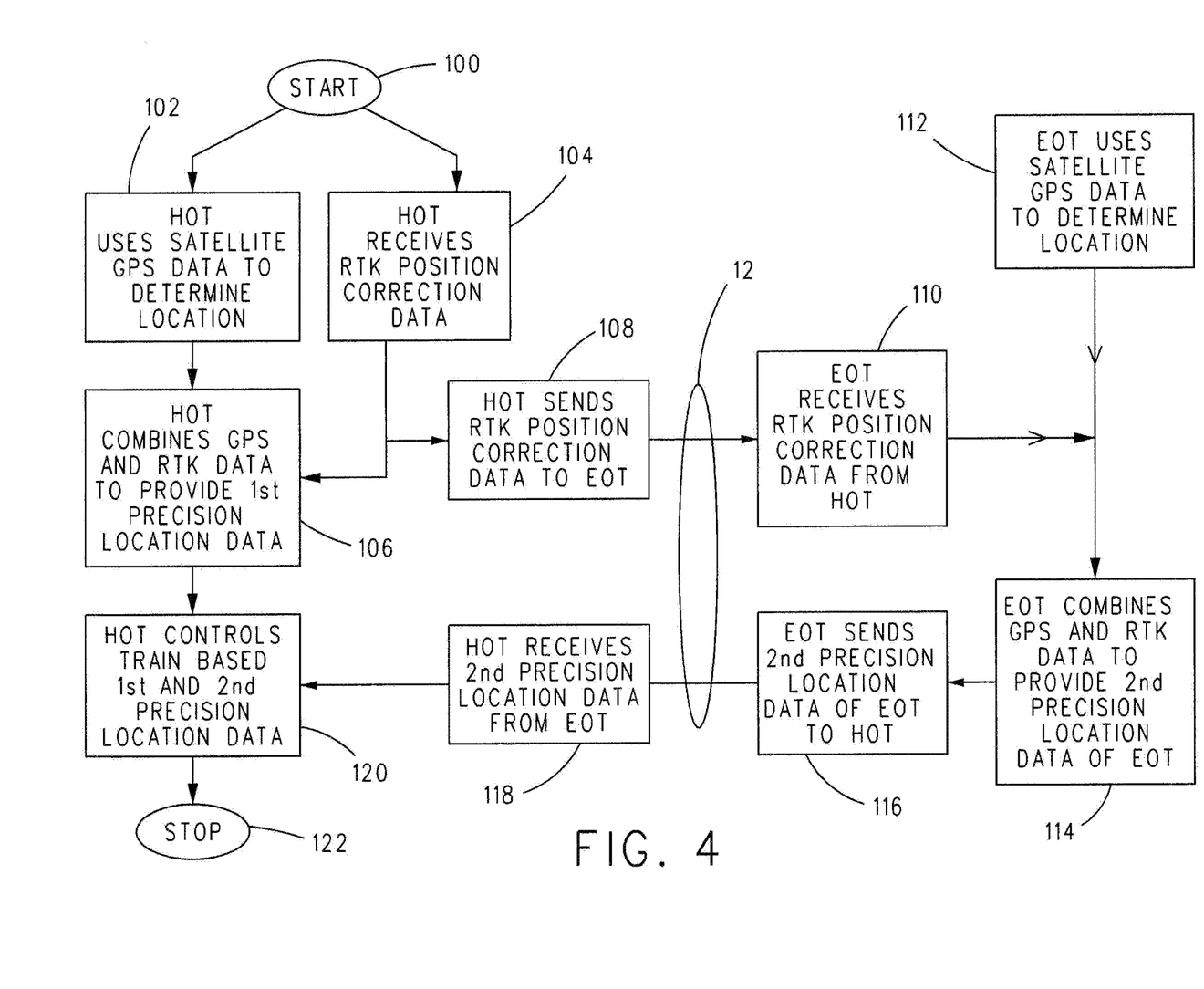
FIG. 4 is a flow diagram of a method of correcting GPS satellite positioning data with position correction data at the HOT and EOT.

With reference to FIG. 4 and with continuing reference to all previous figures, a method of correcting GPS satellite positioning data 32 with position correction data 40 at the HOT 8 and EOT 10 will now be described.

In a non-limiting embodiment or example, the method begins at start step 100 and advances in parallel to steps 102 and 104. In step 102, HOT 8 uses received satellite GPS data to determine its location. In step 104, HOT 8 receives RTK position correction data 40 from base station 36. In step 106, the output of steps 102 and 104 are combined by HOT 8 to provide first, precision, geographical position data of HOT 8.

In step 108, HOT 8 sends position correction data 40 to EOT 10. In step 110, EOT 10 receives position correction data 40 from HOT 8. In step 112, EOT 10 uses satellite GPS data to determine its location. In step 114, EOT 10 combines satellite GPS data and position correction data 40 to provide second, precision, geographical position data of EOT. In step 116, EOT 10 sends the second, precision, geographical position data to HOT 8. In step 118, HOT 8 receives the second, precision, geographical position data from EOT 10. In step 120, HOT, e.g., under the control of a train operator, controls train 2 based on the first and second, precision, geographical position data. Thereafter, the method advances to stop step 122.

In a non-limiting embodiment or example, in the foregoing method, the first, precision, geographical position data corresponds to the first geographical position of radio receiver 18 and the second, precision, geographical position data corresponds to the geographical position of radio receiver 28. In a non-limiting embodiment or example, the sending of the position correction data 40 from the HOT to the EOT in steps 108 and 110 and the sending of the second, precision, geographical position data of the EOT to the HOT in steps 116 and 118 occurs via communication link 12.

In a non-limiting embodiment or example, the first, precision, geographical position data can be determined by processor 14, radio receiver 18, or some combination of processor 14 and radio receiver 18. Similarly, the second, precision, geographical position data can be determined by processor 24, radio receiver 28, or some combination of processor 24 and radio receiver 28. In an example, the particular element or elements utilized to determine the first, precision, geographical position data and/or the second, precision, geographical position data are not to be construed in a limiting sense.

The method shown in FIG. 4 can be repeated periodically or aperiodically as deemed suitable and/or desirable to enable proper operation of train 2. In an example, steps 102 and 112 require that the GPS satellite radio positioning data 32 be received by HOT 8 and EOT 10 respectively.

As can be seen, disclosed herein is a method comprising: (a) receiving, by first and second radio receivers 18, 28 mounted to respective lead and last vehicles 4, 6-4 of a train 2, satellite radio positioning data 32; (b) receiving, by the first radio receiver 18, position correction data 40; (c) determining first geographical position data corresponding to a first geographical position 50 of the first radio receiver 18 based on the position correction data 40 received by the first radio receiver 18 in step (b) and the satellite radio positioning data 32 received by the first radio receiver 18 in step (a); (d) following step (b), receiving at the last vehicle 6-4 of the train 2 a copy of the position correction data 40 received by the first radio receiver 18 in step (b), wherein the copy of the position correction data 40 received by the first radio receiver 18 is communicated from the lead vehicle 4 of the train 2 to the last vehicle 6-4 of the train 2; (e) following step (d), determining second geographical position data corresponding to a second geographical position 52 of the second radio receiver 28 based on the position correction data 40 received at the last vehicle 6-4 of the train 2 in step (d) and the satellite radio positioning data 32 received by the second radio receiver 28 in step (a); and (f), following step (e), receiving at the lead vehicle 4 of the train 2 from the last vehicle 6-4 of the train 2 the second geographical position data determined in step (e).

The method can further include: (g) controlling at least one operation of the train 2 based on at least the second geographical position data received at the lead vehicle 4 of the train 2 from the last vehicle 6-4 of the train 2 in step (f).

The first geographical position data can be determined by a first processor 14, or the first radio receiver 18, or the combination of the first processor 14 and the first radio receiver 18. The second geographical position data can be determined by a second processor 24, or the second radio receiver 28, or the combination of the second processor 24 and the second first radio receiver 28.

The first processor 14 can be mounted to the lead vehicle 4 of the train 2. The second processor 24 can be mounted to the last vehicle 6-4 of the train 2.

In step (d), the copy of the position correction data 40 can be communicated wirelessly 12 from the lead vehicle 4 to the last vehicle 6-4.

In step (f), the second geographical position data received at the lead vehicle 4 of the train 2 can be communicated wirelessly 12 from the last vehicle 6-4 of the train 2 to the lead vehicle 4 of the train 2.

In step (b), the position correction data 40 can be received by the first radio receiver 18 wirelessly from a ground base station 36.

The position correction data 40 can comprise a distance and/or a direction 46, 48 to adjust the satellite radio positioning data 32 received by the first and second radio receivers 18, 28 to determine the respective first geographical position data and the second geographical position data that correspond respectively to the first geographical position 50 of the first radio receiver 18 and the second geographical position 52 of the second radio receiver 28.

Also disclosed is a method comprising: (a) receiving, by a first radio receiver 18, satellite radio positioning data 32; (b) receiving, by the first radio receiver 18, position correction data 40; (c) determining, by a first processor 14, or the first radio receiver 18, or the combination of the first processor 14 and the first radio receiver 18, a geographical location 50 of the first radio receiver 18 based on the satellite radio positioning data 32 received in step (a) and the position correction data 40 received in step (b); (d) receiving, by a second radio receiver, the satellite radio positioning data 32; (e) receiving, by a second processor 24 from the first processor 14, a copy of the position correction data received by the first radio receiver 18 in step (b); and (f) determining, by the second processor 24, or the second radio receiver 28, or the combination of the second processor 24 and the second radio receiver 28, a geographical location 52 of the second radio receiver 28 based on the satellite radio positioning data 32 received in step (d) and the position correction data 40 received in step (e).

In general, as used herein, the first radio receiver 18 receiving (or sampling) satellite radio position or positioning data 32 and the second radio receiver 30 receiving (or sampling) the satellite radio position or positioning data 32 is to be understood as the second radio receiver 30 receiving (or sampling) the same or different satellite radio position or positioning data 32 as the first radio receiver 18. In one non-limiting embodiment or example, the sampling rate of the first and second radio receivers can be 10 Hz and the first and second radios receivers can sample at times t1 and t2 separated by 0.05 seconds.

The method can further include: (g) receiving by the first processor from the second processor the geographical location of the second radio receiver determined in step (f).

A communication link 12 can communicatively connect the first and second processors 14, 24. In step (e), the copy of the position correction data 40 can be received by the second processor 24 from the first processor 14 via the communication link 12. In step (g), the geographical location 52 of the second radio receiver 28 can be received by the first processor 14 from the second processor 28 via the communication link 12.

The communication link 12 can be a radio link between first and second radio transceivers 22, 30.

The satellite radio positioning data 32 can be global positioning system (GPS) satellite radio positioning data. The position correction data 40 can be real-time kinematic (RTK) position correction data.

The first processor 14 can be located on a lead vehicle 4 of a train 2. The second processor 24 can be located on a last vehicle 6-4 of the train 2.

The first radio receiver 18 and the first processor 14 can comprise a head of train (HOT) unit 8 of a train 2. The second radio receiver 28 and the second processor 24 can comprise an end of train (EOT) unit 10 of the train 2.

Finally, disclosed herein is method comprising: (a) providing, in a first vehicle 4 or 6 of a train 2, a head of train (HOT) unit 8; (b) providing, in a second vehicle 6 of the train 2, an end of train (EOT) unit 10; (c) providing a radio communication link 12 between the HOT 8 and the EOT 10; (d) receiving, by the HOT 8, first satellite radio position data 32 and position correction data 40; (e) determining, by the HOT 8, a first geographic location 50 of the HOT 8 based on the first satellite radio position data 32 and the position correction data 40 received by the HOT 8 in step (d); (f) receiving, by the EOT 10, second satellite radio position data 32; (g) receiving, by the EOT 10 from the HOT 8 via the radio communication link 12, a copy of the position correction data 40 received by the HOT 8 in step (d); (h) determining, by the EOT 10, a second geographic location 52 of the EOT 10 based on the second satellite radio position data 32 and the position correction data 40 received by the EOT 10 in step (g); and (i) receiving, by the HOT 8 from the EOT 10, a copy of second geographic location 52 of the EOT 10.

In an example, the first vehicle of the train can be a leading vehicle of the train or a vehicle between the leading vehicle and the last vehicle of the train. The second vehicle of the train can be the last vehicle of the train or a vehicle between the leading vehicle and the last vehicle of the train. In an example, the second vehicle of the train can follow the first vehicle of the train in a travelling direction of the train.

The method can further include: (j) controlling, by the HOT 8, at least one operation of the train 2 based on at least the second geographic location 52 of the EOT 10 received by the HOT 8 from the EOT 10 in step (i).

The HOT 8 can include a first processor 14 and a first radio receiver 18 in communication with the first processor 14. The EOT 10 can include a second processor 24 and a second radio receiver 28 in communication with the second processor. The radio communication link 12 can comprise: a first radio transceiver 22 in communication with the first processor 14, a second radio transceiver 30 in communication with the second processor 24, and the first and second radio transceivers 22, 30 in wireless communication with each other.

The position correction data 40 can include a distance and/or a direction 46, 48 that the first satellite radio position data 42 and the second satellite radio position data 44 are adjusted to determine the respective first geographic location 50 of the HOT 8 and the second geographic location 52 of the EOT 10.

Finally, the first and second satellite radio position data 32 can be the same data.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method comprising:
   (a) receiving, by first and second radio receivers mounted to respective lead and last vehicles of a train, satellite radio positioning data;
   (b) receiving, by the first radio receiver, position correction data from a base station that determines the position correction data from phase measurements of satellite signals received by the base station from one or more satellites;
   (c) determining, by at least a first processor, first geographical position data corresponding to a first geographical position of the first radio receiver based on the position correction data received by the first radio receiver in step (b) and the satellite radio positioning data received by the first radio receiver in step (a);
   (d) following step (b), receiving, at the last vehicle of the train, a copy of the position correction data received by the first radio receiver in step (b), wherein the copy of the position correction data received by the first radio receiver is communicated from the lead vehicle of the train to the last vehicle of the train;
   (e) following step (d), determining, by at least the first processor, second geographical position data corresponding to a second geographical position of the second radio receiver based on the position correction data received at the last vehicle of the train in step (d) and the satellite radio positioning data received by the second radio receiver in step (a); and
   (f) following step (e), receiving, at the lead vehicle of the train from the last vehicle of the train, the second geographical position data determined in step (e).

2. The method of claim 1, further including:
   (g) controlling at least one operation of the train based on at least the second geographical position data received at the lead vehicle of the train from the last vehicle of the train in step (f).

3. The method of claim 1, wherein:
   the first geographical position data is determined by a first processor, or the first radio receiver, or the combination of the first processor and the first radio receiver; and
   the second geographical position data is determined by a second processor, or the second radio receiver, or the combination of the second processor and the second first radio receiver.

4. The method of claim 3, wherein:
   the first processor is mounted to the lead vehicle of the train; and
   the second processor is mounted to the last vehicle of the train.

5. The method of claim 1, wherein, in step (d), the copy of the position correction data is communicated wirelessly from the lead vehicle to the last vehicle.

6. The method of claim 1, wherein, in step (f), the second geographical position data received at the lead vehicle of the train is communicated wirelessly from the last vehicle of the train to the lead vehicle of the train.

7. The method of claim 1, wherein, in step (b), the position correction data is received by the first radio receiver wirelessly from a ground base station.

8. The method of claim 1, wherein the position correction data comprises a distance and a direction to adjust the satellite radio positioning data received by the first and second radio receivers to determine the respective first geographical position data and the second geographical position data.

9. A method comprising:
   (a) receiving, by a first radio receiver, satellite radio positioning data;
   (b) receiving, by the first radio receiver, position correction data from a base station that determines the position correction data from phase measurements of satellite signals received by the base station from one or more satellites;

(c) determining, by a first processor, or the first radio receiver, or the combination of the first processor and the first radio receiver, a geographical location of the first radio receiver based on the satellite radio positioning data received in step (a) and the position correction data received in step (b);

(d) receiving, by a second radio receiver, the satellite radio positioning data;

(e) receiving, by a second processor from the first processor, a copy of the position correction data received by the first radio receiver in step (b); and (f) determining, by the second processor, or the second radio receiver, or the combination of the second processor and the second radio receiver, a geographical location of the second radio receiver based on the satellite radio positioning data received in step (d) and the position correction data received in step (e).

10. The method of claim 9, wherein the method further includes:

(g) receiving by the first processor from the second processor the geographical location of the second radio receiver determined in step (f).

11. The method of claim 10, wherein:
a communication link communicatively connects the first and second processors;
in step (e), the copy of the position correction data is received by the second processor from the first processor via the communication link; and
in step (g), the geographical location of the second radio receiver is received by the first processor from the second processor via the communication link.

12. The method of claim 11, wherein the communication link is a radio link.

13. The method of claim 9, wherein:
the satellite radio positioning data is global positioning system (GPS) satellite radio positioning data; and
the position correction data is real-time kinematic (RTK) position correction data.

14. The method of claim 9, wherein:
the first processor is located on a lead vehicle of a train; and
the second processor is located on a last vehicle of the train.

15. The method of claim 9, wherein:
the first radio receiver and the first processor comprise a head of train (HOT) unit of a train; and
the second radio receiver and the second processor comprise an end of train (EOT) unit of the train.

16. A method comprising:
(a) providing, in a first vehicle of a train, a head of train (HOT) unit;
(b) providing, in a second vehicle of the train, an end of train (EOT) unit;
(c) providing a radio communication link between the HOT unit and the EOT unit;
(d) receiving, by the HOT unit, first satellite radio position data and position correction data, the position correction data received from a base station that determines the position correction data from phase measurements of satellite signals received by the base station from one or more satellites;
(e) determining, by the HOT unit, a first geographic location of the HOT unit based on the first satellite radio position data and the position correction data received by the HOT unit in step (d);
(f) receiving, by the EOT unit, second satellite radio position data;
(g) receiving, by the EOT unit from the HOT unit via the radio communication link, a copy of the position correction data received by the HOT unit in step (d);
(h) determining, by the EOT unit, a second geographic location of the EOT unit based on the second satellite radio position data and the position correction data received by the EOT unit in step (g); and
(i) receiving, by the HOT unit from the EOT unit, a copy of second geographic location of the EOT unit.

17. The method of claim 16, further including:
(j) controlling, by the HOT unit, at least one operation of the train based on at least the second geographic location of the EOT unit received by the HOT unit from the EOT unit in step (i).

18. The method of claim 16, wherein:
the HOT unit includes a first processor and a first radio receiver in communication with the first processor;
the EOT unit includes a second processor and a second radio receiver in communication with the second processor; and
the radio communication link comprises:
a first radio transceiver in communication with the first processor;
a second radio transceiver in communication with the second processor; and
the first and second radio transceivers in wireless communication with each other.

19. The method of claim 16, wherein the position correction data includes a distance and a direction that the first satellite radio position data and the second satellite radio position data are adjusted to determine the respective first geographic location of the HOT unit and the second geographic location of the EOT unit.

20. The method of claim 16, wherein the first and second satellite radio position data are the same.

* * * * *